(12) United States Patent
Schreurs

(10) Patent No.: US 10,980,176 B1
(45) Date of Patent: Apr. 20, 2021

(54) MINIMAL RADIUS SYSTEM FOR CUTTING VEGETATION

(71) Applicant: Gerald H. Schreurs, Harrisburg, SD (US)

(72) Inventor: Gerald H. Schreurs, Harrisburg, SD (US)

( * ) Notice: Subject to any disclaimer, the term of this patent is extended or adjusted under 35 U.S.C. 154(b) by 356 days.

(21) Appl. No.: 16/211,967

(22) Filed: Dec. 6, 2018

(51) Int. Cl.
| | | |
|---|---|---|
| *A01D 34/84* | (2006.01) |
| *A01D 34/86* | (2006.01) |
| *A01D 34/66* | (2006.01) |
| *A01D 34/82* | (2006.01) |
| *A01D 101/00* | (2006.01) |

(52) U.S. Cl.
CPC ............. *A01D 34/84* (2013.01); *A01D 34/66* (2013.01); *A01D 34/82* (2013.01); *A01D 34/863* (2013.01); *A01D 2101/00* (2013.01)

(58) Field of Classification Search
CPC ...... A01D 34/66; A01D 34/82; A01D 34/685; A01D 34/001; A01D 34/84; A01D 34/863; A01D 34/866; A01D 2101/00
See application file for complete search history.

(56) References Cited

U.S. PATENT DOCUMENTS

| | | | |
|---|---|---|---|
| 3,397,521 A * | 8/1968 | Danuser | A01D 34/685 56/11.9 |
| 3,797,209 A | 3/1974 | Davis | |
| 4,104,851 A | 8/1978 | Perry | |
| 4,395,865 A | 8/1983 | Davis, Jr. | |
| 4,858,417 A | 8/1989 | Priefert | |
| 5,035,107 A | 7/1991 | Scarborough | |
| 5,113,640 A | 5/1992 | Colistro | |
| 5,177,942 A | 1/1993 | Hager | |
| 5,463,853 A * | 11/1995 | Santoli | A01D 34/685 56/6 |
| 5,483,789 A | 1/1996 | Gummerson | |
| 5,715,667 A * | 2/1998 | Goman | A01D 75/30 56/13.6 |
| 5,809,758 A * | 9/1998 | Flanigan | A01D 34/001 56/13.7 |
| 6,308,503 B1 * | 10/2001 | Scag | A01D 34/685 56/16.9 |
| 6,330,783 B2 | 12/2001 | Oxley | |
| 6,354,388 B1 | 3/2002 | Teal | |
| 7,398,637 B1 * | 7/2008 | Sevey | A01D 34/84 56/12.7 |

(Continued)

*Primary Examiner* — Adam J Behrens
(74) *Attorney, Agent, or Firm* — Jeffrey A. Proehl; Woods, Fuller, Shultz & Smith, PC

(57) ABSTRACT

A system may include a mowing apparatus for mounting on a tractor to move with the tractor to cut vegetation growing from a ground surface, with the tractor being of the type having a primary wheel assembly with a pair of primary wheels rotatable about an axle axis, the axle axis lying in a substantially vertical axle plane. The mowing apparatus may include a primary mowing assembly mountable on the tractor, and the primary mowing assembly may include at least one primary rotating blade structure. The mowing apparatus may further include a supplemental mowing assembly mountable on the tractor, with the supplemental mowing assembly having an outboard supplemental rotating blade structure rotating about a rotation axis lying in the axle plane defined by the primary wheel assembly.

18 Claims, 7 Drawing Sheets

(56) References Cited

U.S. PATENT DOCUMENTS

| | | | |
|---|---|---|---|
| 8,464,504 B1* | 6/2013 | Huff | A01D 43/16 |
| | | | 56/12.7 |
| 2017/0042084 A1* | 2/2017 | Waitt | A01D 69/03 |
| 2017/0112053 A1* | 4/2017 | Babkin | A01D 34/866 |
| 2019/0254228 A1* | 8/2019 | Tate | A01D 34/82 |

* cited by examiner

MINIMAL RADIUS SYSTEM FOR CUTTING VEGETATION

BACKGROUND

Field

The present disclosure relates to vegetation cutting apparatus and more particularly pertains to a new system for cutting vegetation for providing a minimal radius to the cutting apparatus of a tractor.

SUMMARY

In one aspect, the present disclosure relates to a system for cutting vegetation growing from a ground surface, and the system may include a tractor having a front and a rear and a longitudinal axis extending between the front and the rear. The tractor may include a primary wheel assembly with a pair of primary wheels rotatable about an axle axis, and the axle axis may lie in a substantially vertical axle plane. The axle axis may extend substantially perpendicular to the longitudinal axis of the tractor. The system may also include a mowing apparatus mounted on the tractor to move with the tractor, and the mowing apparatus may include a primary mowing assembly mounted on the tractor, with the primary mowing assembly including at least one primary rotating blade structure. The mowing apparatus may further include a supplemental mowing assembly mounted on the tractor, with the supplemental mowing assembly having an outboard supplemental rotating blade structure rotating about a rotation axis lying in the axle plane defined by the primary wheel assembly.

In another aspect, the present disclosure relates to a mowing apparatus for mounting on a tractor to move with the tractor to cut vegetation growing from a ground surface. The tractor may be of the type having a primary wheel assembly with a pair of primary wheels rotatable about an axle axis, with the axle axis lying in a substantially vertical axle plane. The mowing apparatus may include a primary mowing assembly mountable on the tractor, with the primary mowing assembly including at least one primary rotating blade structure. The mowing apparatus may further include a supplemental mowing assembly mountable on the tractor, with the supplemental mowing assembly having an outboard supplemental rotating blade structure rotating about a rotation axis lying in the axle plane defined by the primary wheel assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
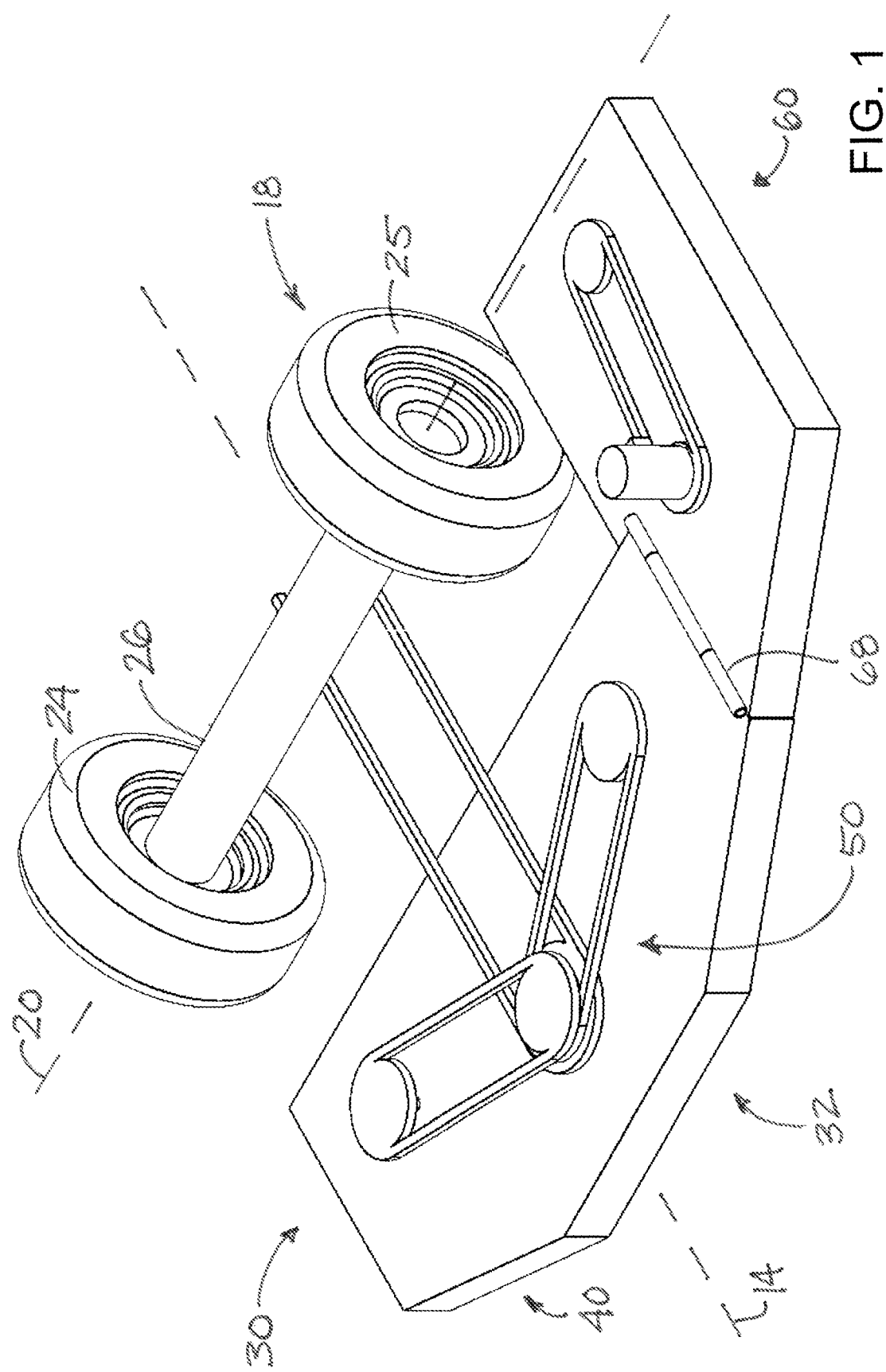
FIG. 1 is a schematic perspective view of selected elements of a new system for cutting vegetation including a primary wheel assembly and the mowing apparatus of the system, with the supplemental mowing assembly in the extended position, according to the present disclosure.
Figure 2:
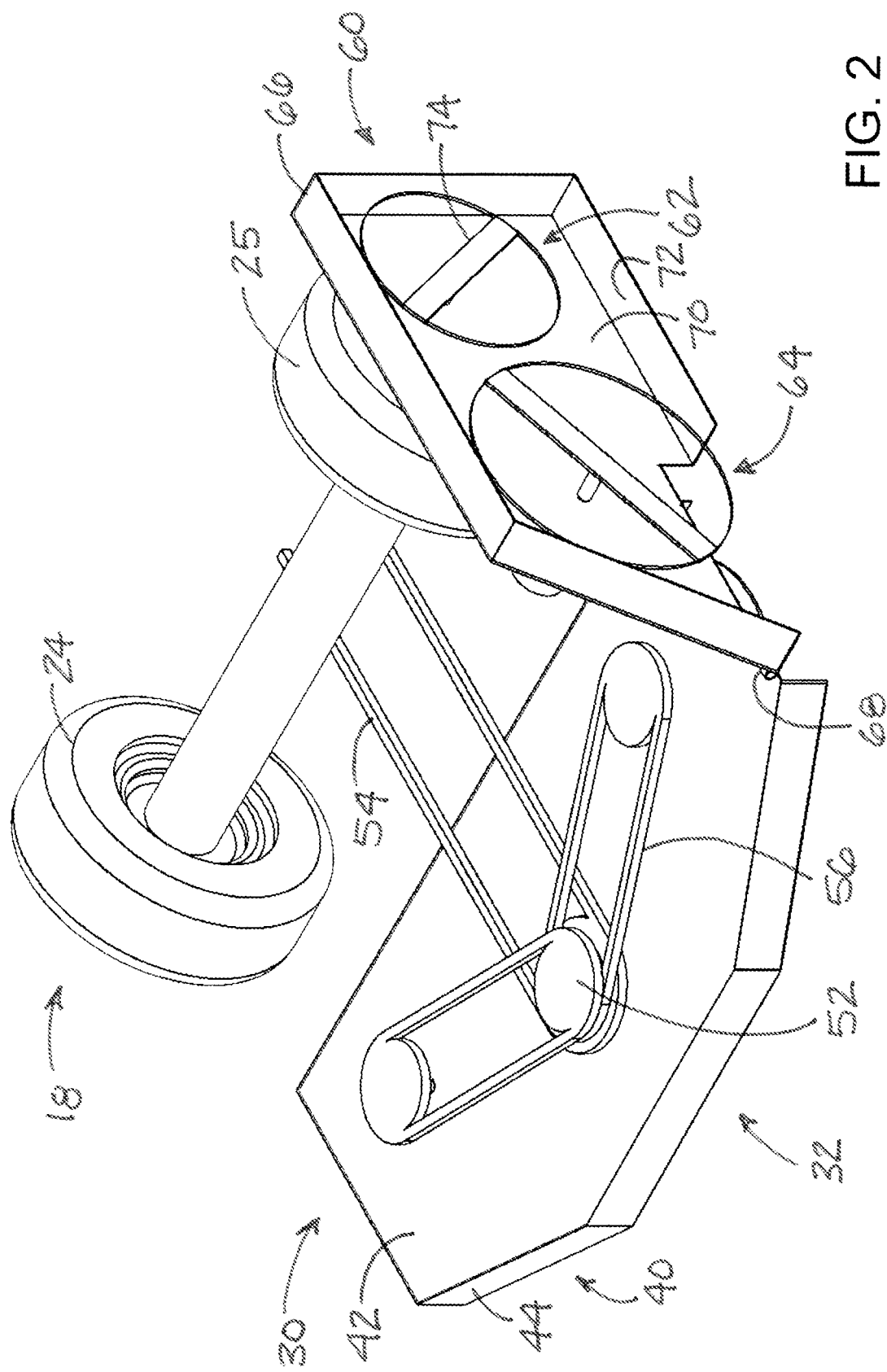
FIG. 2 is a schematic perspective view of selected elements of the system for cutting vegetation with the supplemental mowing assembly in the retracted position, according to the present disclosure.
Figure 3:
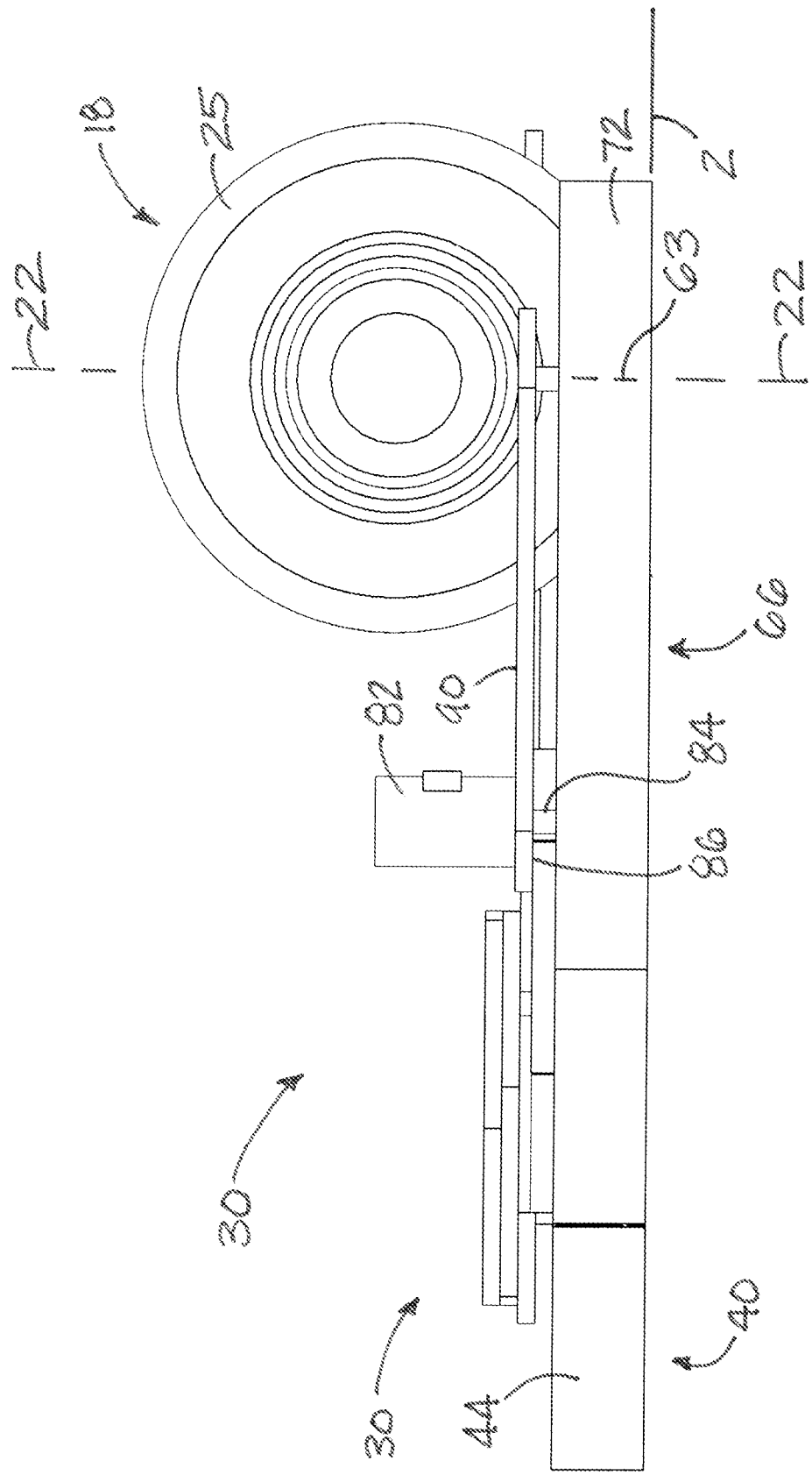
FIG. 3 is a schematic side view of the selected elements of the system for cutting vegetation, according to an illustrative embodiment.
Figure 4:
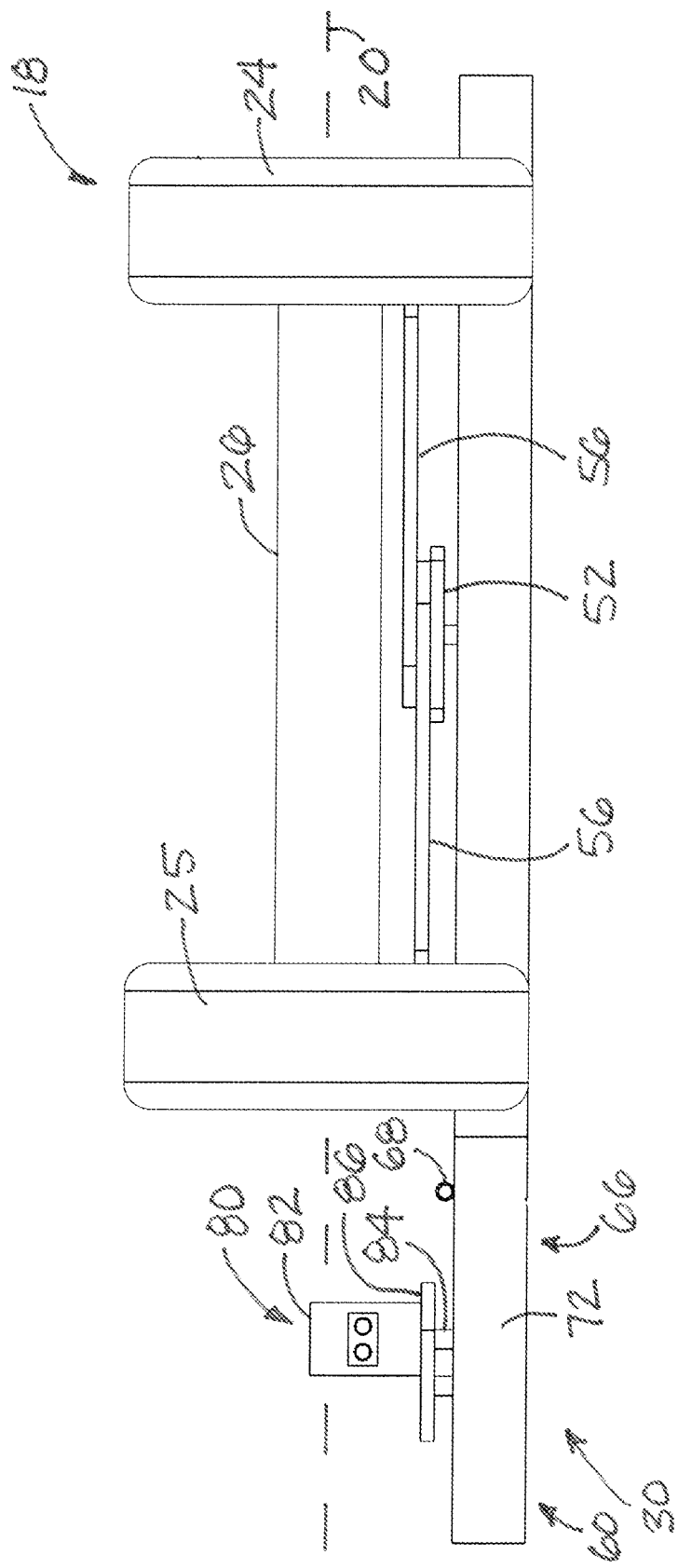
FIG. 4 is a schematic front view of the selected elements of the system for cutting vegetation, according to an illustrative embodiment.
Figure 5:
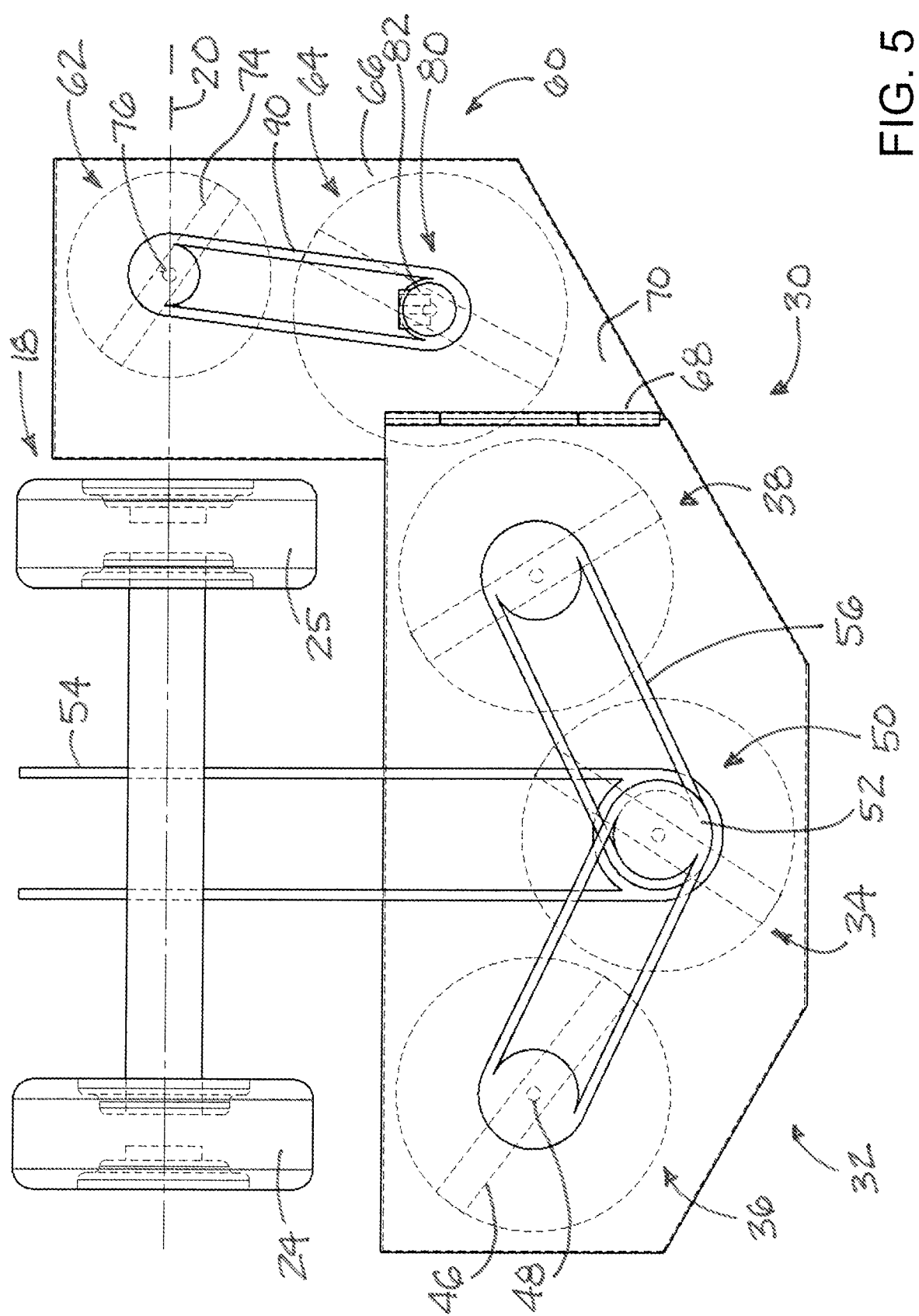
FIG. 5 is a schematic top view of the selected elements of the system for cutting vegetation with various hidden structures shown in broken lines, according to an illustrative embodiment.
Figure 6:
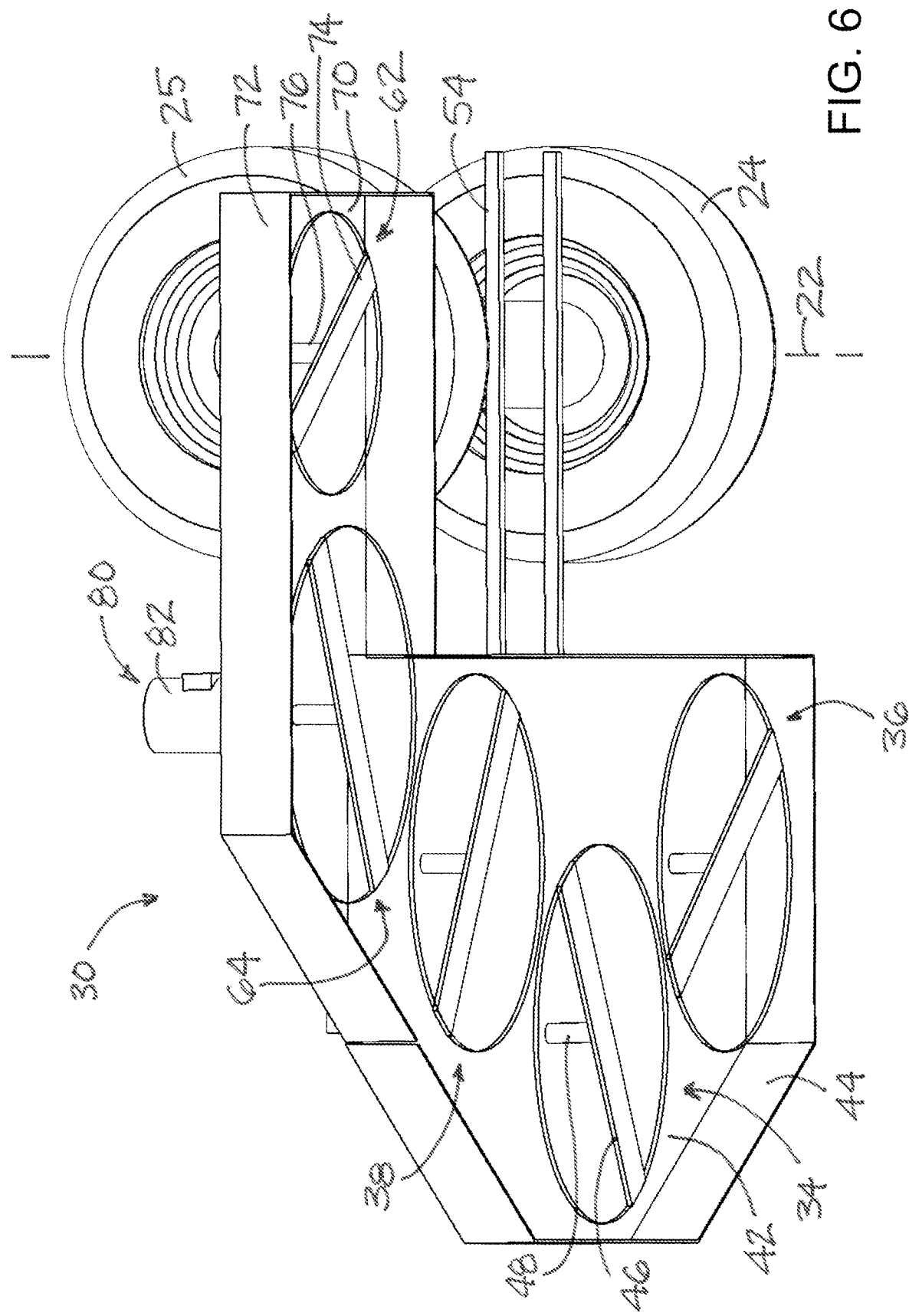
FIG. 6 is a schematic lower perspective view of the selected elements of the system for cutting vegetation, according to an illustrative embodiment.
Figure 7:
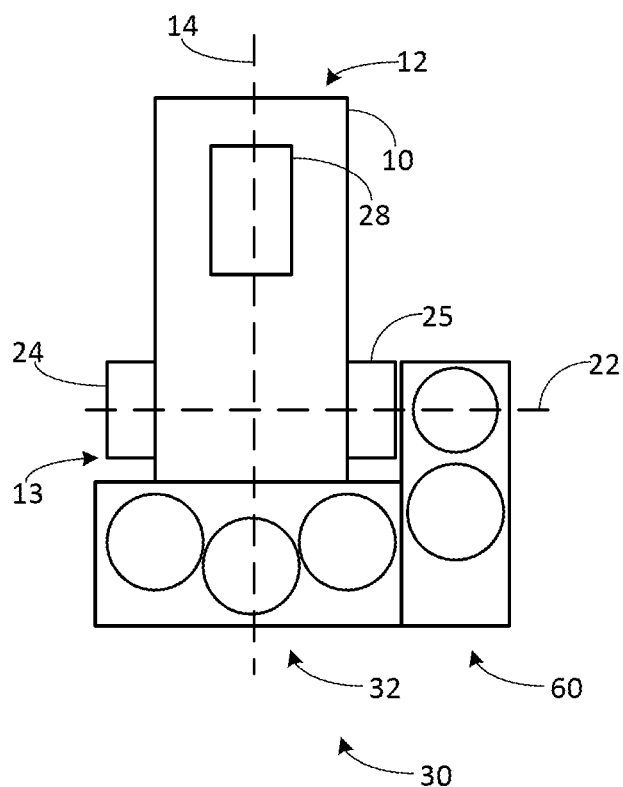
FIG. 7 is a schematic diagram of the system for cutting vegetation, according to an illustrative embodiment.

With reference now to the drawings, and in particular to FIGS. 1 through 7 thereof, a new system for cutting vegetation embodying the principles and concepts of the disclosed subject matter will be described.

Vegetation cutting apparatus, such as lawnmowers, are utilized to trim grass or other growth at a desired height above the ground surface. Various apparatus have been employed to support and rotate the blades utilized to cut the vegetation, including lawn tractors which typically carry the rotating blades below or behind the tractor. One highly advantageous tractor design is said to provide "zero turn radius" (sometimes referred to as "zero turn") movement in which the main or primary wheels of the tractor are able to rotate in opposite rotational directions in order to greatly reduce if not eliminate the radius about which the tractor is able to execute a turn. This feature makes the tractor highly maneuverable and facilitates cutting operations which are often executed around various obstacles such as trees, landscaping features, etc.

However, the applicant has recognized that despite the significant maneuverability of "zero turn" tractors, the mowing apparatus mounted on such tractors are not able to take the greatest advantage of the improved maneuverability of the tractor itself. Thus, while the tractor may be able to execute a turn that nominally has a zero radius, the rotating blades of the mowing apparatus are not able to execute the same tight turn radius, and thus may require more maneuvering than is truly desirable.

The applicant has further recognized that in order to maximize the benefit of the improved tractor maneuverability, at least one of the rotating vegetation cutting blades may be positioned outward or outboard of the wheels providing the "zero turn" capability to the tractor as a supplement to other cutting blades positioned behind or underneath the tractor. Further, the axis about which the supplemental outboard cutting blade rotates may lie in a vertical plane defined by the axis of rotation of the "zero turn" wheels to provide highly effective maneuverability of the supplemental cutting blade. Additional supplemental cutting blades may be positioned between the outboard cutting blade and the other cutting blades positioned behind or underneath the tractor to provide more seamless vegetation cutting action.

In one aspect, the disclosure relates to a system 1 for cutting vegetation growing from a ground surface 2, and may include a tractor 10 which has a front 12 and a rear 13 with a longitudinal axis 14 extending between the front and the rear and also generally extending in the typical direction of forward travel of the tractor when not engaging in a turning maneuver. The tractor 10 may include a frame and a primary wheel assembly 18 mounted on the frame. The primary wheel assembly may define an axle axis 20 which may lie in a substantially vertical axis plane 22. The axle axis 20 may be oriented substantially perpendicular to the longitudinal axis 14 of the tractor, and is typically substantially horizontally oriented. Typically, the primary wheel assembly 18 may be located at the rear 13 of the tractor, although other positions of the assembly 18 on the frame of the tractor may be utilized.

The primary wheel assembly 18 may include a pair of primary wheels 24, 25 which are rotatable about the axle axis 20 and may be rotatable in opposite rotational directions in order to achieve the nominal "zero turn radius" functionality. The primary wheels 24, 25 may be spaced away from each other in a lateral direction that is substantially transverse to the longitudinal axis 14 of the tractor. The primary wheel assembly 18 may also include an axle housing 26 mounted on the frame and extending in a lateral direction between the pair of wheels 24, 25. Typically, at least one secondary wheel may be located on the frame of the tractor at a location longitudinally spaced or separated from the primary wheel assembly 18 to provide additional support to the tractor. Often a pair of the secondary wheels may be employed and may comprise a caster wheel mounted on the frame that permits free rotation of the secondary wheels about both vertical and horizontal axes. The tractor 10 may also include a power source 28 which is configured to rotate the primary wheels 24, 25 of the primary wheel assembly, as well as provide power to implements associated with the tractor, such as a mowing apparatus.

The system may further include a mowing apparatus 30 which is mountable on the tractor 10 to move with the tractor over and with respect to the ground surface 2. The mowing apparatus may include a primary mowing assembly 32 which is mountable on the tractor and may be positionable rearward of the primary wheel assembly 18 or may optionally be located forward of the primary wheel assembly. The primary mowing assembly 32 may include a primary frame and at least one primary rotating blade structure 34.

The primary mowing assembly 32 typically includes a plurality of rotating blade structures 34, 36, 38. The primary rotating blade structures 34, 36, 38 may be positioned in an array that extends substantially lateral to the longitudinal axis 14 of the tractor. The plurality of the primary rotating blade structures may include an inward primary rotating blade structure 34 which may be located closest to a central longitudinal axis of the tractor, and a pair of outward primary rotating blade structures 36, 38 which may be located laterally outwardly from the inward primary rotating blade structure 34. The outward primary rotating blade structures 36 and 38 may be located on opposite sides of the inward primary rotating blade structure 34.

The primary mowing assembly may also include a primary housing 40 which may extend over the primary rotating blade structure or structures, and may include a top wall 42 and a perimeter wall 44 which extends downwardly from edges of the top wall. Illustratively, each of the primary blade structures 34, 36, 38 may include a blade 46 and a rotating shaft 48 which is rotatably mounted on the primary housing 40 and on which the blade 46 may be mounted such that the blade and shaft rotate as a unit. Typically, the rotating shaft 48 and the blade 46 rotate about a substantially vertical axis such that the blade rotates in a substantially horizontal plane.

The mowing apparatus 30 may also include a primary drive assembly 50 which is configured to drive the primary rotating blade structure or structures to rotate. In some illustrative embodiments, the primary drive assembly includes a pulley 52 which is mounted on the rotating shaft 48 of each of the primary rotating blade structures 34, 36, 38 to rotate as a unit with the respective shaft 48 and blade 46. The primary drive apparatus 50 may also include a main belt 54 which may extend between the power source 28 on the tractor and a first one of the pulleys associated with the primary rotating blade structures to thereby transfer rotational motion between the power source and the first pulley. The primary drive assembly may also include at least one auxiliary belt 56 which extends between at least two pulleys associated with the primary rotating blade structures to transfer rotational motion between the pulleys and thereby the blade structures. Illustratively, the auxiliary belt 56 may extend between the first pulley and one of the other pulleys associated with the primary rotating blade structures. It will be recognized that other means and mechanisms may be used to transfer rotational motion from the power source of the tractor to the primary drive assembly, such as other types of mechanical linkages but also including hydraulic systems, electric motors, etc.

The mowing apparatus 30 may also include a supplemental mowing assembly 60 which is mountable on the tractor, and may be mountable on the tractor via mounting on the primary mowing assembly 32 to be moved with the tractor and the primary mowing assembly. In some embodiments, the supplemental mowing assembly 60 may be movably mounted on the primary mowing assembly, and may be movable between an extended position (see, e.g., FIGS. 1 and 3 through 6) and a retracted position (see, e.g., FIG. 2). The extended position of the supplemental mowing assembly 60 may be highly suitable for operation of the mowing apparatus 30 to cut vegetation on the ground surface using both the primary and supplemental mowing assemblies. Movement of the supplemental mowing assembly to the retracted position may facilitate storage and/or transport of the system 1 when the mowing apparatus 30, or at least the supplemental mowing assembly 60, is not being utilized. Further, the orientation or position of the supplemental mowing assembly 60 may be allowed to float or follow the contours of the ground surface particularly in situations where the ground surface over which the system is moving has some variation from completely horizontal. In such embodiments, a follower wheel (not shown) may be mounted on the supplemental mowing assembly to support the assembly 60 at the desired height or elevation above the ground surface 2. Optionally, movement of the supplemental mowing assembly between the extended and retracted positions may be effected in a powered manner using any suitable devices, such as, for example, hydraulic actuators or linear actuators.

The supplemental mowing assembly 60 may include a supplemental frame and at least one supplemental rotating blade structure, which typically includes a plurality of supplemental rotating blade structures 62, 64 which are mounted for rotation with respect to the frame. The supplemental rotating blade structures 62, 64 may include an outboard supplemental rotating blade structure 62 which is rotatable about a rotation axis 63 lying in the axle plane 22 of the primary wheel assembly 18, and may also include an inboard supplemental rotating blade structure 64 positioned adjacent to the outboard supplemental rotating blade structure and may be positioned approximately between the blade structure 62 and the primary rotating blade structures of the primary mowing assembly 32.

The supplemental mowing assembly 60 may also include a supplemental housing 66 which extends over the supplemental rotating blade structure or structures 62, 64 and may be mounted on the primary housing 40 of the primary mowing assembly. The supplemental housing 66 may be movably mounted on the primary housing, and supplemental housing may be mounted so as to pivot with respect to the primary housing. In some embodiments, the supplemental housing may be mounted on the primary housing by a hinge structure 68 which permits pivoting of the supplemental housing with respect to the primary housing. Illustratively, the hinge structure may be oriented such that the supplemental housing pivots about a substantially horizontal axis which may be oriented substantially parallel to the longitudinal axis 14 of the tractor, although other orientations of the hinge structure may be utilized. The supplemental housing 66 may include an upper wall 74 extending over the rotating blade structures 62, 64 and a side wall 72 which extends downwardly from the edges of the upper wall.

Each of the supplemental blade structures 62, 64 may include a blade 74 and a rotating shaft 76 rotatably mounted on the supplemental housing in a manner permitting the blade 74 and the shaft 76 to rotate as a unit about the rotation axis 63, and may do so about a substantially vertical axis.

The supplemental mowing assembly may further include a supplemental drive assembly 80 which is configured to drive the supplemental rotating blade structure or structures 62, 64, and may do so independent of the primary drive assembly. The supplemental drive assembly 80 may include a supplemental power source 82 which may be mounted on or otherwise associated with the supplemental housing 66. The supplemental power source may have a driver shaft 84 that is rotated, and a driver pulley 86 may be mounted on the driver shaft to be rotated by the shaft. In some embodiments, the power source may comprise a hydraulically-driven motor which may be driven by a hydraulic or hydrostatic power source on the tractor, but may also include other suitable types of power including, for example, an electric motor. The supplemental drive assembly may also include a driven pulley 88 which is mounted on the rotating shaft 76 of at least one of the supplemental blade structures to rotate as a unit with the shaft 76 and the blade 74 of the respective supplemental blade structure. A supplemental belt 90 of the supplemental drive assembly 80 may extend between the supplemental power source and the driven pulley 88 of at least one of the supplemental blade structures to transfer rotational motion between the supplemental power source and the driven pulley.

The supplemental mowing apparatus 60 may be positioned or positionable laterally outward of the primary wheel assembly 18, and at least one of the supplemental rotating blade structures may be positioned laterally outwardly from the primary wheel assembly. The rotating shaft 76 of the laterally outward or outboard supplemental rotating blade structure 62 may be located in the axis plane 22 of the primary wheel assembly particularly when the supplemental mowing assembly is in the extended position so that the rotation axis 63 of the outboard supplemental rotating blade structure 62 lies in the axis plane 22.

The extended position of the supplemental mowing assembly may be characterized by at least the outboard supplemental rotating blade structure 62 being positioned adjacent to the ground surface 2, and may be further characterized by the blade structure 62 rotating about a substantially vertical axis with the blade rotating in a plane that is oriented substantially parallel to the ground surface and may further be substantially horizontal in orientation.

The retracted position of the supplemental mowing assembly may be characterized by rotation axis 63 being oriented substantially horizontal, and in the retracted position the supplemental mowing assembly may be inactive with the supplemental drive assembly 80 being inoperable to prevent possible injury from contact with the blade structures.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for cutting vegetation growing from a ground surface, the system including:
   a tractor having a front and a rear and a longitudinal axis extending between the front and the rear, the tractor including a primary wheel assembly with a pair of primary wheels rotatable about an axle axis, the axle axis lying in a substantially vertical axle plane, the axle axis extending substantially perpendicular to the longitudinal axis of the tractor; and
   a mowing apparatus mounted on the tractor to move with the tractor, the mowing apparatus including:
      a primary mowing assembly mounted on the tractor, the primary mowing assembly including at least one primary rotating blade structure within a primary housing;
      a supplemental mowing assembly comprising a supplemental housing mounted on the primary housing; the supplemental mowing assembly having an outboard supplemental rotating blade structure rotating about a rotation axis lying in the axle plane defined by the primary wheel assembly; and wherein the outboard supplemental rotating blade structure is positioned immediately adjacent one of the wheels of the pair of primary wheels.

2. The system of claim 1 wherein the supplemental mowing assembly is positioned laterally outward of the primary wheel assembly.

3. The system of claim 1 wherein the outboard supplemental rotating blade structure of the supplemental mowing assembly is positioned laterally outwardly from the primary wheel assembly.

4. The system of claim 1 wherein the outboard supplemental rotating blade structure includes a blade and a rotating shaft located in the axle plane of the primary wheel assembly.

5. The system of claim 1 wherein the supplemental mowing assembly is movable between an extended position and a retracted position.

6. The system of claim 5 wherein the extended position of the supplemental mowing assembly is characterized by the outboard supplemental rotating blade structure rotating about a substantially vertical axis.

7. The system of claim 5 wherein the extended position of the supplemental mowing assembly is characterized by the outboard supplemental rotating blade structure being positioned adjacent to the ground surface on which the tractor rests.

8. The system of claim 5 wherein the supplemental housing is movably mounted on the primary housing to permit movement of the supplemental mowing assembly between the extended and retracted positions.

9. The system of claim 8 wherein the supplemental housing is pivotally mounted on the primary housing such that the supplemental mowing assembly pivots with respect to the primary mowing assembly when moving between the extended and retracted positions.

10. The system of claim 1 wherein the supplemental mowing assembly further includes an inboard supplemental rotating blade structure positioned between the outboard supplemental rotating blade structure and the at least one primary rotating blade structure of the primary mowing assembly.

11. The system of claim 1 wherein each of the blade structures includes a rotating shaft and a blade mounted on the rotating shaft to rotate with the shaft as a unit.

12. The system of claim 1 wherein the primary mowing assembly of the mowing apparatus additionally comprises a primary drive assembly configured to drive the at least one primary rotating blade structure utilizing power from a power source of the tractor.

13. The system of claim 12 wherein the supplemental mowing assembly of the mowing apparatus additionally comprises a supplemental drive assembly configured to drive the outboard supplemental rotating blade structure independent of the primary drive assembly.

14. A mowing apparatus for mounting on a tractor to move with the tractor to cut vegetation growing from a ground surface, the tractor being of the type having a primary wheel assembly with a pair of primary wheels rotatable about an axle axis, the axle axis lying in a substantially vertical axle plane, the mowing apparatus including:
   a primary mowing assembly mountable on the tractor, the primary mowing assembly including at least one primary rotating blade structure within a primary housing;
   a supplemental mowing assembly comprising a supplemental housing mounted on the primary housing; the supplemental mowing assembly having an outboard supplemental rotating blade structure rotating about a rotation axis lying in the axle plane defined by the primary wheel assembly; and wherein the outboard supplemental rotating blade structure is positioned immediately adjacent one of the wheels of the pair of primary wheels.

15. The apparatus of claim 14 wherein the outboard supplemental rotating blade structure includes a blade and a rotating shaft; and
   wherein the supplemental mowing assembly is positionable laterally outward of the primary mowing assembly and the primary wheel assembly such that the rotating shaft of the outboard supplemental rotating blade structure is located in the axle plane of the primary wheel assembly.

16. The apparatus of claim 14 wherein the supplemental mowing assembly is movable between an extended position and a retracted position with respect to the primary mowing assembly;
   wherein the extended position of the supplemental mowing assembly is characterized by the outboard supplemental rotating blade structure being rotatable about a substantially vertical axis and positionable adjacent to the ground surface on which the tractor rests.

17. The apparatus of claim 16 wherein the supplemental housing is movably mounted on the primary housing to permit movement of the supplemental mowing assembly between the extended and retracted positions.

18. The apparatus of claim 17 wherein the supplemental housing is pivotally mounted on the primary housing such that the supplemental mowing assembly pivots with respect to the primary mowing assembly when moving between the extended and retracted positions.

* * * * *